June 18, 1929.   R. F. BRAGG ET AL   1,717,433
WRITING DESK
Filed Sept. 29, 1927
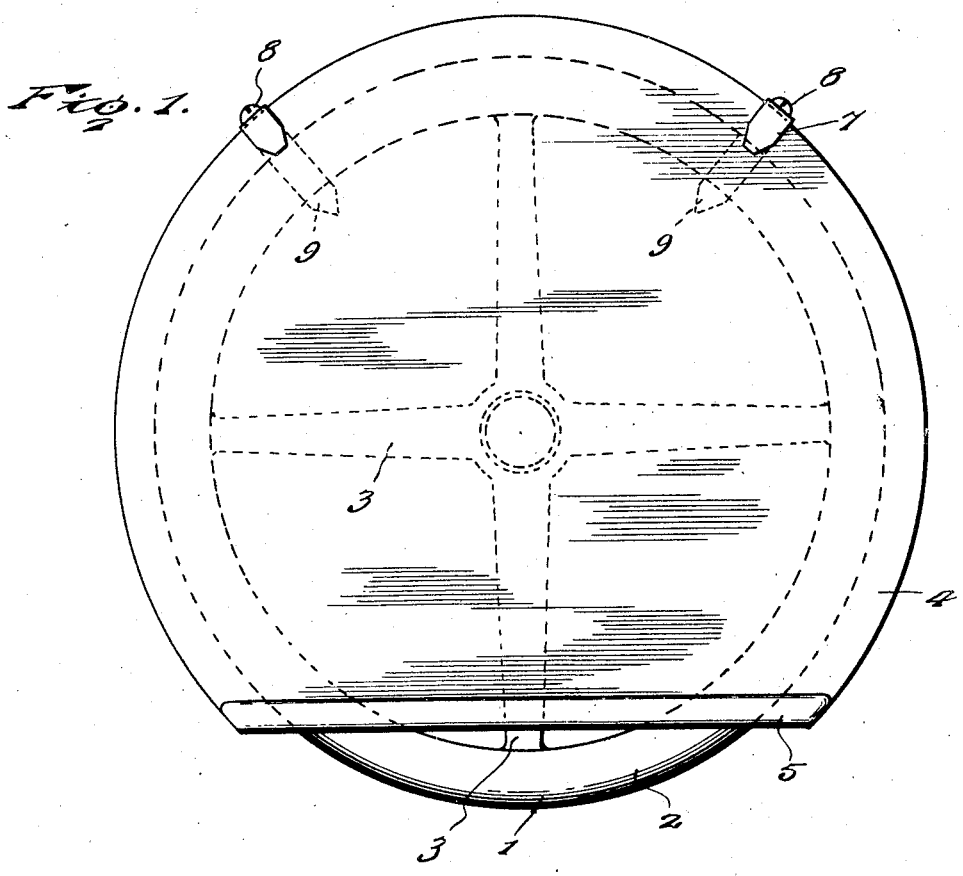
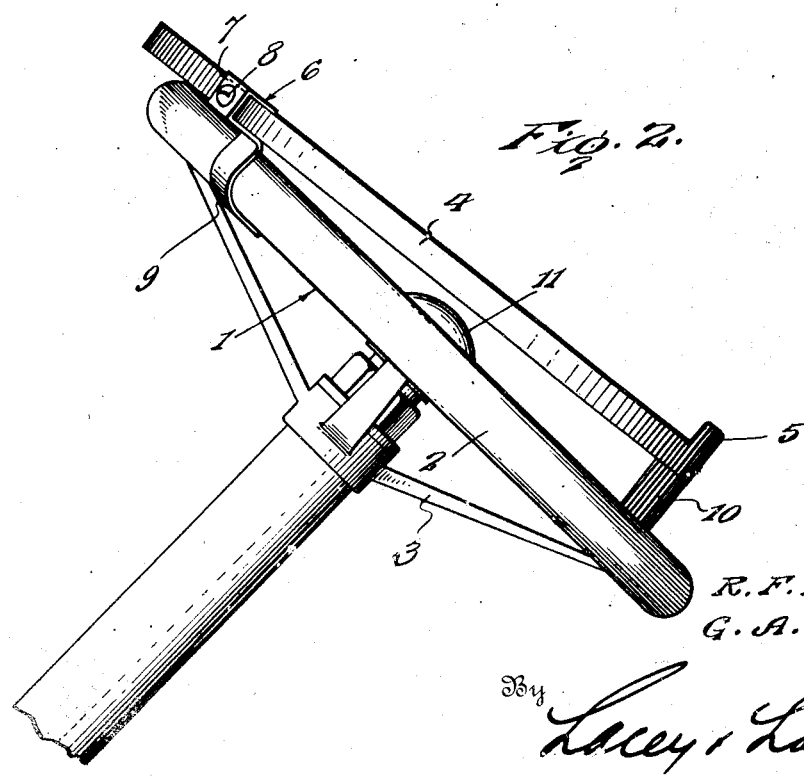
Inventors
R. F. Bragg.
G. A. Weston.
By Lacey & Lacey, Attorneys Patented June 18, 1929.

1,717,433

UNITED STATES PATENT OFFICE.

RALPH F. BRAGG AND GEORGE A. WESTON, OF MILO, MAINE.

WRITING DESK.

Application filed September 29, 1927. Serial No. 222,851.

The present invention is directed to improvements in writing desks.

The primary object of the invention is to provide a device of this character so constructed that it can be easily and quickly attached to the steering wheel of an automobile, and readily removed therefrom when not in use.

Another object of the invention is to provide a device of this kind constructed in such manner that it can be detachably secured to the steering wheel and maintained in inclined position thereon in order that a person may place a writing pad in convenient position thereon.

With these and other objects in view, this invention resides in the novel features of construction, formation, combination, and arrangement of parts to be hereinafter more fully described, claimed and illustrated in the accompanying drawing, in which,—

Figure 1 is a top plan view of the desk showing it in place upon a steering wheel.

Figure 2 is a side elevation thereof.

Referring to the drawing, 1 designates the steering wheel of an automobile, which, as usual, includes the rim 2 and supporting spokes 3 therefor.

The desk consists of a table 4 substantially circular in shape and may be formed from wood or sheet metal as desired.

The table is somewhat greater in diameter than the steering wheel in order that ample room will be provided for writing materials, and has its lower end provided with a transversely extending ledge 5 which serves as a holder for pens and pencils, as well as a stop for the writing pad.

A pair of clamps 6 are employed for holding the table upon the wheel and include U-shaped clamps 7 which are secured to the periphery of the table by screws 8. These clamps have formed integral therewith resilient hooks 9 which are adapted to yieldably engage the rim 2 of the steering wheel to hold the table firmly engaged thereon, the construction being such that they may be quickly disengaged from the rim to permit ready removal of the table.

The lower end of the table is provided with a transverse rib 10 adapted to rest upon the rim 2 in order that the table will be held out of contact with the horn button 11. It will be of course understood in instances wherein the horn button 11 is placed elsewhere that the rib 10 may be eliminated and the table permitted to rest directly upon the rim 2.

From the foregoing description it will be seen that we have provided a writing desk which can be quickly mounted upon the steering wheel in order that a writing pad or other article may be supported in convenient reach of the occupant of the vehicle.

Having thus described the invention, we claim:

1. A device of the class described comprising a table, U-shaped clamps fixed to the periphery of the table and having one of their arms terminating in resilient hooks carried for detachable engagement with the rim of a steering wheel of a motor vehicle.

2. A device of the class described comprising a substantially circular table, clamps carried by the table and having resilient hooks carried thereby adapted to detachably engage the rim of a steering wheel, said table having a transverse ledge and a transverse rib carried thereby and disposed opposite each other, as and for the purpose set forth.

In testimony whereof we affix our signatures.

RALPH F. BRAGG. [L. S.]
GEORGE A. WESTON. [L. S.]